Patented June 17, 1952

2,600,422

UNITED STATES PATENT OFFICE 2,600,422

MALEATE-METHACRYLATE COPOLYMERS

Harry T. Neher, Bristol, and La Verne N. Bauer and William L. Van Horne, Philadelphia, Pa., assignors to Rohm & Haas Company, Philadelphia, Pa., a corporation of Delaware No Drawing. Application February 3, 1950, Serial No. 142,339

6 Claims. (Cl. 260—78.5)

This invention relates to copolymers of maleinoid esters and methacrylic esters and compositions comprising oils having a waxy pour point in which said copolymers are dissolved. The copolymers are prepared from maleinoid esters (A) of a saturated, straight chained, aliphatic, monohydric alcohol, ROH, in which R is an alkyl group of 16 to 18 carbon atoms, and an unsaturated dicarboxylic acid, $$HOOCC(X)=CHCOOH$$

in which X is hydrogen, chlorine, or the methyl group, and from a methacrylic ester (B) of methacrylic acid and a saturated monohydric aliphatic alcohol, R'OH, in which R' is an alkyl group of 4 to 14 carbon atoms, preferably of 8 to 12 carbon atoms, the proportion of ester A to ester B in the copolymer being within the limits defined below.

Although addition of resinous or polymeric products to oils has been proposed for such purposes as increasing their viscosity, improving their temperature-viscosity relationships, and for lowering pour points, it has not been possible to predict whether such products will in fact depress the pour point. Some polymeric materials have no influence on pour point, others raise the pour point. We have, however, discovered new types of polymeric products which exert a profound lowering of pour point at relatively low concentrations in oils. One valuable type is that obtained by copolymerizing malenoid esters of large molecular size with alkyl methacrylates of moderate molecular size within proportions herein defined.

Depression of pour point is not obtained with polymers of dicetyl maleate, dicetyl fumarate, dioctadecyl maleate, or the like. Polymers of hexyl methacrylate, octyl methacrylate, decyl methacrylate, and tetradecyl methacrylate are likewise not of value as pour point depressants. Mixtures of individual polymers do not cause depression of the pour point. We have found, however, that copolymers of this invention are peculiarly effective as oil additives for depressing the pour point of wax-containing oils.

Suitable malenoid esters for preparing these copolymers include hexadecyl, heptadecyl, and octadecyl maleates, fumarates, chloromaleates, citraconates, and mesaconates, the general formula for which is $$ROOCC(X)=CHCOOR$$

These are prepared by the usual esterification methods from acids or anhydrides (when they exist). The alcohol portion of the ester may be obtained from a single pure alcohol, from mixed alcohols, or from commercial mixtures which comprise chiefly the 16 and 18 carbon atom alcohols. The two ester groups may be from the same alcohol or from two different alcohols.

The methacrylic esters are of the formula $R'OOCC(CH_3)=CH_2$. The alkyl group R' may be straight or branched. It may be any of the butyl, amyl, hexyl, heptyl, octyl, nonyl, decyl, dodecyl, or tetradecyl groups. The methacrylate may be formed from a pure alcohol or a mixture of alcohols such as obtained in commercial operations. Some useful esters which may be mentioned are butyl methacrylate, isobutyl methacrylate, amyl methacrylate, hexyl methacrylate, 2-ethylbutyl methacrylate, n-octyl methacrylate, 2-ethylhexyl methacrylate, 2-octyl methacrylate, isononyl methacrylate, 3,5,5-trimethylhexyl methcrylate, decyl methacrylate, dodecyl methacrylate, 5,5,7,7-tetramethyloctyl methacrylate, and myristyl methacrylate.

The two types of esters, A and B, are copolymerized within proportions which depend upon the number of carbon atoms in the longest chain of the alkyl group of the methacrylate. There may be mixed with one mole of a maleinoid ester as above defined from one mole of methacrylate of the defined type up to $x$ moles of said methacrylate. The term $x$ is defined by the equation $x=n-2$, where $n$ is the number of carbon atoms in the longest carbon chain of the alkyl group forming the methacrylic ester. This definition of effective proportions holds surprisingly well for the different methacrylates except for the largest methacrylates where the limitations are apparently somewhat less sharp.

Copolymerization is effected under conditions that yield true copolymers rather than a mixture of polymers. The copolymerization reaction is usually carried out in the presence of an inert, volatile, organic solvent, such as benzene, toluene, xylene, an aromatic naphtha, or other inert solvent. Use of an inert atmosphere is highly desirable. A catalyst is used to promote copolymerization. Amounts of catalyst used may vary from about 3% to 15%. In a preferred method there may be used 1% to 6% of catalyst at the start of copolymerization and more catalyst is added as copolymerization proceeds. Solvent is often desirably added from time to time to ensure that copolymer remains in solution. Copolymerization is carried on until a desired molecular size is attained.

Catalysts for copolymerization include organic peroxides and acyclic azo compounds. Typical azo compounds are azodiisobutyronitrile and azodiisobutyrates, including esters such as the methyl and ethyl esters. Suitable peroxides are acetyl peroxide, caproyl peroxide, lauroyl peroxide, benzoyl peroxide, dibenzal peroxide, di-tert.-butyl diperphthalate, tert.-butyl perbenzoate, 2,2-bis(tert.-butylperoxy)butane, methyl ethyl ketone peroxide, di-tert.-butyl peroxide, tert.-butyl hydroperoxide, etc.

Catalyst is added to the monomers and the mixture is heated to 75° C. to 150° C. One temperature range may be used at the start and another as copolymerization proceeds. Optimum temperatures depend upon the choice of variables, including solvent selected, concentration of monomers, concentration of catalyst, copolymerization schedule, and time. The variables are fixed with regard to the intended type of copolymer and its molecular size. Soluble copolymers are obtainable with molecular weights from about 1000 to 20,000 or more. Copolymers of large molecular size act not only as pour point depressants but also as viscosity index improvers. They may also serve to increase the viscosity of oils in which they are dissolved.

The process of preparing copolymers of this invention is described in greater detail in the following illustrative examples.

*Example 1*

A reaction vessel was equipped with stirrer, thermometer, inlet for supplying nitrogen gas, reflux condenser, and funnel for adding material. A mixture was prepared from 167 parts by weight of dioctadecyl maleate, 334 parts of dodecyl methacrylate, 25 parts by weight of toluene, and 15 parts of benzoyl peroxide. With the reaction vessel maintained at 112° C.–125° C. the mixture was run into the vessel over the period of 1.8 hours. This temperature range was held until 2.8 hours after which the vessel and contents were kept between 105° C. and 98° C. Catalyst was added as follows: at 2.7 hours 6 parts, at 4.75 hours 15 parts, and at 5.4 hours 6 parts. Solvent was added as follows: at 2.7 hours 42 parts, at 4.75 hours 85 parts, at 5.4 hours 43 parts, at 6 hours 300 parts, and at 6.8 hours 110 parts. Heating was discontinued at 7.5 hours. The product was a 38.4% solution of copolymer in toluene. A 30% solution of this copolymer in toluene had a viscosity of 478.8 centistokes at 100° F.

A mixture of 99.5 parts by weight of the product and 57.4 parts by weight of a light lubricating oil was stirred and heated under reduced pressure. Final stripping was done at 140° C./3 mm. The resulting solution contained 36.3% of copolymer dissolved in the oil. This material was found suitable for addition to wax-containing lubricating oils and served as a poor point depressant.

*Example 2*

The process of Example 1 was followed with a mixture of 150 parts of dioctadecyl maleate and 350 parts of dodecyl methacrylate. The same weights of benzoyl peroxide and toluene were used. Initial heating was done at 110°–116° C. and the subsequent heating maintained the temperature at 100°–105° C. Total reaction time was 8 hours. The product was a 37.6% solution of copolymer in toluene. A solution of 30% of copolymer in toluene had a viscosity of 564.6. The copolymer was transferred to a light lubricating oil as above to give a 40% solution of copolymer. The viscosity of this oil solution was 1685 centistokes at 210° F. and 11,400 centistokes at 100° F. It provided a convenient medium for the addition of the copolymer to oils.

*Example 3*

A mixture of 33 parts of dioctadecyl citraconate, 67 parts of dodecyl methacrylate, 20 parts of toluene, and 2.5 parts of benzoyl peroxide was placed in the reaction vessel. It was heated at 120° C. for 5 hours and at 100°–105° C. until the end of 8.3 hours. Addition of benzoyl peroxide was made as follows: at 3.4 hours 1 part, at 5.2 hours 2.5 parts, at 6.2 hours 1 part, and at 7.2 hours 0.4 part. At 8.2 hours about 90 parts of toluene was added. The product was a 46% solution of copolymer in toluene. A 30% toluene solution of this copolymer had a viscosity of 15.4 centistokes at 100° F.

This solution was stirred and heated with a light oil to 140° C./2 mm. to give a 37.8% solution of copolymer. This was a useful means for introducing the copolymer into lubricating oils. The copolymer was a highly effective pour point depressant therefor.

Repetition of the above procedure with substitution of dioctadecyl mesaconate for citraconate yielded a similar copolymer, also effective as a pour point depressant.

*Example 4*

A mixture of 100 parts each of dicetyl maleate and n-octyl methacrylate in 100 parts of toluene was treated with 16.8 parts of lauroyl peroxide and run into the reaction vessel at 120° C. This temperature was held for 3 hours and heating was continued for 5 hours at 100°–108° C. From time to time additions of lauroyl peroxide were made in an amount of 36 parts and of toluene 200 parts. The product was a 36% solution of copolymer. A 30% toluene solution of this copolymer had a viscosity of 3 centistokes at 100° F. This copolymer was useful as a pour point depressant.

*Example 5*

A mixture of 130 parts of dicetyl maleate, 70 parts of butyl methacrylate, 10 parts of benzoyl peroxide, and 50 parts of toluene was heated at 115°–180° C. for two hours and at 100°–102° C. for 5.75 hours. There was added a total of 19.6 parts of benzoyl peroxide and of 150 parts of toluene in successive increments. The product obtained was a 47.3% solution of copolymer. A 30% solution in toluene had a viscosity of 4.8 centistokes at 100° F. This copolymer was an effective pour point depressant when dissolved in waxy oils.

*Example 6*

A mixture of 15.9 parts of dicetyl fumarate, 84.1 parts of myristyl methacrylate, 50 parts of toluene, and 5 parts of benzoyl peroxide was heated at 120° C. for 3 hours and 100° C. for 5 hours. From time to time catalyst was added along with solvent. The added catalyst amounted to 10 parts and the added toluene to 50 parts. A 46.4% solution of copolymer resulted. A 30% solution of copolymer in toluene had a viscosity of 10.3 centistokes at 100° F.

*Example 7*

A mixture of 49 parts of dicetyl chloromaleate, 51 parts of n-hexyl methacrylate, 2.5 parts of benzoyl peroxide, and 10 parts of toluene was heated at 115°–125° C. for 3 hours and between 95° and 108° C. for 5 hours. During the heating additions of peroxide were made totaling 5 parts and of toluene 140 parts. The product was a 36.4% solution of copolymer in toluene. A 30% solution had a viscosity of 100 centistokes at 100° F.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97–47). In some instances, this test was supplemented or replaced with shock chilling and/or maximum pour tests. Cf. Proc. A. S. T. M. 45, Appendix I, p. 244 (1945). The shock chilling determination is made by observing the sample during the initial cooling step with the cooling jacket at −60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (Oil I). This was an oil which proved to be relatively sensitive to the action of pour point depressants. The second oil (Oil II) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F. A third oil (Oil III) was a 500 Mid-Continent solvent-extracted neutral (S. A. E. 30) having a pour point of +25° F. This was known to be an oil which was not readily changed as to its pour point.

A copolymer from dicetyl maleate and n-butyl methacrylate in a mole ratio of 1:1 was dissolved in Oil I. At concentrations of 0.5% to 0.04% it depressed the pour point to 0° F. In Oil III at 0.5% it caused the pour point to be 0° F.

A copolymer from the same esters in a mole ratio of 1:2 depressed the pour point of Oil I to −10° F. at concentrations of 0.5% and 0.25%.

A copolymer from the same esters in a mole ratio of 1:3 did not change the pour point of Oil I when dissolved therein at a concentration of 0.25%.

A copolymer from dicetyl maleate and n-hexyl methacrylate in a mole ratio of 1:3.7 depressed the pour point of Oil I 55° F. at 0.5% concentration and 40° F. at 0.25%.

A copolymer from dicetyl maleate and n-octyl methacrylate in a 1:1 mole ratio depressed the pour point of Oil I 30° F. at concentrations from 0.5% to 0.04%. A copolymer from the same esters in a 1:4 ratio depressed the pour point of Oil I 55° F. at 0.5%, 50° F. at 0.25%, and 40° F. at 0.1%. A copolymer from these esters in a 1:6 mole ratio depressed the pour point of Oil I to +5° F. at 0.5%. The copolymer with a mole ratio of 1:8 gave a pour point of +30° F. in Oil I at 0.5%.

A copolymer from dioctadecyl fumarate and 2-ethylhexyl methacrylate in a 1:4 mole ratio lowered the pour point of Oil I to −10° F. at 0.5% and to 0° F. at 0.25%.

A copolymer from dioctadecyl fumarate and 3,5,5-trimethyl hexyl methacrylyate in a mole ratio of 1:4 caused the pour point of Oil I to be −5° F. at 0.5% concentration and +5° F. at 0.25%.

A copolymer from dioctadecyl maleate and n-dodecyl methacrylate in a mole ratio of 1:1 was dissolved in Oil I. At 0.5% the pour point became +10° F. A copolymer from these esters in a mole ratio of 1:2.4 caused the pour point of Oil I to be −15° F. at 0.5% and at 0.25%, to −10° F. at 0.1%, and to −5° F. at 0.04%.

A copolymer from the same esters in a mole ratio of 1:5.7 caused a lowering of the pour point of Oil I to −30° F. at 0.25% and to −10° F. at 0.04%. The pour point of Oil II became −10° F. with 0.1% of this copolymer and of Oil III −20° F. at 0.5%.

A copolymer from these esters in a mole ratio of 1:9.7 gave a depression of 60° F. in Oil I at 0.25% and 35° F. at 0.04%. In Oil II it lowered the pour point to −10° F. and in Oil III to −20° F. at 0.5%. It may be commented that the 1:9.7 ratio is approaching the upper limit for the proportion of the didodecyl ester. While the upper limit with dodecyl or myristyl esters is not so sharp as with smaller alkyl groups, nevertheless the effectiveness of copolymers with large proportions of didodecyl esters fades out. With large proportions of the didodecyl ester the lowering effect entirely disappears. For example, a copolymer from the above pair of esters in a mole ratio of 1:25 did not change the pour point of Oil I at 0.5%.

A copolymer from dioctadecyl citraconate and dodecyl methacrylate in a mole ratio of 1:4.9 gave a depression at 0.5% in Oil I of 65° F., at 0.25% of 60° F., at 0.1% of 55° F., and 15° F. at 0.04%. The maximum pour point of Oil III was found to be −5° F. with 0.5% of the copolymer dissolved therein.

Copolymers prepared from dioctadecyl fumarate and dodecyl methacrylate in mole ratios from 1:1 to 1:10 were found to give significant depressions of pour point in Oil I. Such copolymer with a mole ratio of 1:1 at 0.5% caused a depression of pour point of 25° F. at 0.5%. A 1:2 copolymer at 0.5% caused a depression of 40° F. A 1:6 copolymer at 0.5% gave a depression of 60° F. A 1:8 copolymer at 0.5% gave a depression of 55° F. A 1:10 copolymer caused a depression of 30° F. at 0.5% and of 20° F. at 0.25%.

A copolymer from dioctadecyl fumarate and a dodecyl methacrylate in which the dodecyl group was branched as derived from olefines through reaction with carbon monoxide and hydrogen to give alcohols was prepared from a mixture of the respective esters in a 1:4 mole ratio. At 0.5% in Oil I this copolymer gave a depression of 35° F.

A series of copolymers was prepared from mixtures of dicetyl fumarate and n-dodecyl methacrylate in varying mole ratios. A copolymer with a 1:1.2 mole ratio gave a depression at 0.5% in Oil I of 30° F. With a ratio of 1:5.7 a depression of 55° F. for the pour point of Oil I was obtained at 0.5% of this copolymer. A copolymer having a mole ratio of 1:9.5 gave at 0.5% in Oil I a depression of 55° F.

A copolymer from dicetyl fumarate and a dodecyl methacrylate, the dodecyl groups of which were those from alcohols prepared from olefines through reaction with carbon monoxide and hydrogen in the presence of a cobalt catalyst, was prepared from a 1:4 mole mixture of respective esters. At 0.5% in Oil I this copolymer gave a depression of 45° F. Since this copolymer had been carried to a molecular size giving a viscosity of 212 centistokes at 100° F. in a 30% toluene solution, it also improved the viscosity index of oils.

A copolymer from dicetyl mesaconate and dodecyl methacrylate in a mole ratio of 1:10 caused a depression of 35° F. at 0.5% in Oil I and of 25° F. in Oil III at 0.5%.

A copolymer from dicetyl chloromaleate and dodecyl methacrylate in a mole ratio of 1:5.7 caused a depression of 55° F. at 0.25% in Oil I.

A copolymer from dioctadecyl maleate and myristyl methacrylate in a 1:11 mole ratio depressed the pour point of Oil I when dissolved therein at 0.5% or 0.25% to 0° F. A copolymer from the same esters in a mole ratio of 1:2.1 depressed the pour point of Oil I to −35° F. at 0.5%. A copolymer from the same esters in a 1:15 mole ratio did not give an effective lowering of pour points.

A polymer was prepared from n-octyl methacrylate and dissolved in Oil I at 0.25%. The pour point of the solution was +25° F. A polymer was made from dihexadecyl maleate. A 0.5% solution of it in Oil I had a pour point of +25° F. The two polymers were mixed in a ratio of one mole of the maleate to four moles of the methacrylate and a 0.25% solution of the mixed polymers made in Oil I. The pour point of this solution was +25° F.

When the copolymers of this invention are carried to relatively large molecular sizes, they act not only as pour point depressants, but also as viscosity index improvers. It may be noted that the depression of pour point depends primarily on choice of esters for forming the copolymer and upon the ratio of one type of ester to the other. This holds true whether the molecular size is small or large. Yet with molecular weights over 5,000 there is a noticeable improvement in the viscosity-temperature relationship of solutions containing these larger copolymers. For example, a copolymer from dioctadecyl maleate and dodecyl methacrylate in a 1:4.87 mole ratio, giving a viscosity of 479 centistokes at 100° F. at 30% in toluene, was dissolved in Oil I at 0.5%. The viscosity of this solution was 5.61 centistokes at 210° F. and 34.01 centistokes at 100° F. Hence, the viscosity index is 113.7. Oil I without additive has viscosities of 5.15 centistokes at 210° F. over 30.9 centistokes at 100° F. and has a viscosity index of 106.9. The above copolymer at 2% in this same oil gives viscosities of 7.21 centistokes at 210° F. and of 43.23 centistokes at 100° F. and has a viscosity index of 131.5.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as anti-oxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

We claim:

1. A copolymer of an ester (A) of a saturated, straight chained, aliphatic monohydric alcohol, ROH, in which R is an alkyl group of 16 to 18 carbon atoms, and an unsaturated dicarboxylic acid, HOOCC(X)=CHCOOH, in which X is a member of the class consisting of hydrogen, chlorine, and the methyl group, and of an ester (B) of methacrylic acid and a saturated, monohydric, aliphatic alcohol, R'OH, in which R' is an alkyl group of 4 to 14 carbon atoms, the proportion of ester (A) groups to ester (B) groups in the copolymer being from 1:1 to 1:(n−2), where n is the number of carbon atoms in the longest straight chain of R'.

2. A copolymer of dicetyl maleate and n-octyl methacrylate in a mole ratio from 1:1 to 1:6.

3. A copolymer of dioctadecyl maleate and dodecyl methacrylate in a mole ratio from 1:1 to about 1:10.

4. A copolymer of dicetyl chloromaleate and n-dodecyl methacrylate in a mole ratio from 1:1 to about 1:10.

5. A copolymer of dioctadecyl fumarate and dodecyl methacrylate in a mole ratio from 1:1 to about 1:10.

6. A copolymer of dicetyl fumarate and dodecyl methacrylate in a mole ratio from 1:1 to about 1:10.

HARRY T. NEHER.
LA VERNE N. BAUER.
WILLIAM L. VAN HORNE.

REFERENCES CITED

The following references are of record in the file of this patent:

UNITED STATES PATENTS

| Number | Name | Date |
|---|---|---|
| 2,047,398 | Voss | July 14, 1936 |
| 2,279,883 | D'Alelio | Apr. 14, 1942 |
| 2,286,351 | Arnold | June 16, 1942 |
| 2,366,517 | Gleason | Jan. 2, 1945 |
| 2,514,895 | Neher et al. | July 11, 1950 |
| 2,544,691 | Kugler et al. | Mar. 13, 1951 |